United States Patent [19]

Sussman et al.

[11] 3,886,540
[45] May 27, 1975

[54] CONDITION RESPONSIVE CONTROL APPARATUS

[75] Inventors: E. Donald Sussman, Natick; Andrew Warner, Weston, both of Mass.

[73] Assignee: The United States of America as represented by the Secretary of the Department of Transportation, Washington, D.C.

[22] Filed: Sept. 7, 1973

[21] Appl. No.: 395,241

[52] U.S. Cl.................. 340/279; 340/53; 128/2 R
[51] Int. Cl. .......................................... G08b 21/00
[58] Field of Search.......... 340/279, 53.63, 64.32 R; 317/134, 137; 307/10 AT; 35/22 R; 128/2 R

[56] References Cited
UNITED STATES PATENTS

| | | | |
|---|---|---|---|
| 1,729,227 | 9/1929 | Reid.............................. | 35/22 R X |
| 2,870,549 | 1/1959 | Craine............................. | 35/22 R |
| 3,390,397 | 6/1968 | Friedlander..................... | 35/22 R X |
| 3,698,385 | 10/1972 | Low................................ | 35/22 X |
| 3,707,710 | 12/1972 | Adler.............................. | 340/279 |
| 3,735,381 | 5/1973 | Zadig.............................. | 340/279 |
| 3,755,776 | 8/1973 | Kotras............................ | 340/279 X |
| 3,772,650 | 11/1973 | Baskerville..................... | 317/134 X |

Primary Examiner—John W. Caldwell
Assistant Examiner—William M. Wannisky
Attorney, Agent, or Firm—Herbert E. Farmer; Harold P. Deeley, Jr.

[57] ABSTRACT

Disclosed is an ignition interlock device that prevents the operation of a motor vehicle until the operator has passed a test indicative of his degree of sobriety. A plurality of lights and push buttons are disposed on a panel. In response to the illumination of certain preselected lights the operator must press the correct button. Thus, the device detects intoxication by measuring the impairment of the operator's ability to make responses spatially incompatible with initiating stimuli.

11 Claims, 2 Drawing Figures

CONDITION RESPONSIVE CONTROL APPARATUS

ORIGIN OF THE INVENTION

The invention described herein was made by employees of the United States Government and may be manufactured and used by or for the Government for governmental purposes without the payment of any royalties thereon or therefor.

BACKGROUND OF THE INVENTION

This invention relates to sobriety testing devices and, more particularly, to a device coupled to the ignition system of a motor vehicle so that an operator of the motor vehicle is required to pass a sobriety test prior to vehicle operation.

Devices interconnected with the ignition systems of motor vehicles to test for sobriety prior to vehicle operation are known. However, the prior art devices measured sobriety by performance of one or more of the following types of tasks: simple jump reaction, pursuit tracking, compensatory tracking, divided attention, mental arithmetic coupled with keyboard entry, digit span memory with keyboard entry, and visual flicker discrimination. Unfortunately all of these techniques have at least one of the following disadvantages. They require extensive training of a subject or they test and therefore discriminate on skills not pertinent to driving such as numerical ability, in addition to discrimination of intoxication. Therefore, they sometimes do not effectively discriminate sober from intoxicated performance. Furthermore, with respect to several tasks mentioned above, as for example jump reaction and mental arithmetic, the performance level in the sober state varies widely among individuals, therefore necessitating the setting of thresholds for each user rather than using a universal threshold. Obviously, individual threshold setting present a problem if the equipped vehicle is to be driven by more than one person.

It is, therefore, an object of this invention to provide an interlock device for use with motor vehicles to prevent the operation of the vehicle by intoxicated individuals wherein the device is reliable, can be supplied at low cost and effectively discriminates between sober and intoxicated states for different persons without requiring different thresholds.

SUMMARY OF THE INVENTION

This invention is characterized by a conditioned response apparatus coupled to a motor vehicle in such a way that a potential operator of the vehicle must pass a test prior to vehicle operation. For example, the device can be coupled to an automobile ignition system in such a way that the potential driver must pass a test indicative of sobriety prior to applying power to the vehicle's ignition system.

In a preferred embodiment a first pair of lights is disposed near a push button on one side of a control panel. A mating pair of lights and push button is disposed on the opposite side of the control panel. Each pair of lights and push button combination is disposed in a vertical array, with the push button at the lower end. One of the four lights is randomly illuminated and the potential vehicle operator is required to make a response to that stimulus. If the illuminated light is one of the upper lights the correct response is for the operator to depress the push button farthest from the illuminated light. Conversely, if the illuminated light is one of the lower lights, the correct response is for the operator to depress the push button nearest the illuminated light. The motor vehicle is disabled for a preselected period of time if the operator makes an incorrect response. Furthermore, a response timer mechanism in the device insures that the motor vehicle is disabled for the preselected period of time if the potential operator fails to make any response within a preselected response time. Preferably, the condition responsive device is wired such that the vehicle is rendered inoperable upon the receipt of an incorrect answer rather than rendered operable upon the receipt of a correct answer. That is significant because responding to an incorrect answer insures that the system cannot be "fooled" by the simultaneous actuation of both push buttons. Consequently, the operator, in order to enable the motor vehicle, is required to make one and only one response, which must be correct, during the preselected response time period. The ability to make responses spatially incompatible with an initiating stimulus markedly decreases with intoxication. It has been found that measurement of the ability to make such spatially incompatible responses is a rapid and accurate system for determining intoxication of persons that is not influenced by particular inherent abilities and is relatively insensitive to individual skill variations among different persons. Therefore, it is felt that the subject condition responsive apparatus provides more accurate and reliable testing than heretofore was possible.

A feature of the invention is the inclusion of a repetition system to provide a preselected number of tests prior to starting the motor vehicle. For example, eight trials are required by the preferred embodiment. The repeated tests are spaced apart. As a person becomes intoxicated his ability to respond to infrequently occurring stimuli decreases. Thus, providing repeated trials renders the test more accurate.

An option that can be utilized in a test employing several trials is that a subject can be required to correctly respond to only a majority of the trials. Thus, for example, correct responses can be required seven out of eight times. This is advantageous because persons, even when sober, will occasionally make an improper response if they are nervous or are thinking about a matter unrelated to the test. An isolated improper response should not penalize a sober person.

Another feature of the preferred embodiment is the inclusion of a relatively high frequency oscillator, for example ten kilohertz, that is coupled to a ring counter and activated when either of the push buttons is depressed. The count in the ring counter determines which of the four stimulus lights will be illuminated for the next test. This is an inexpensive method of determining which light will be illuminated. In addition, the method is effectively random inasmuch as persons are incapable of timing their actuations of the push buttons to within a fraction of a millisecond.

DESCRIPTION OF THE DRAWINGS

These and other features and objects of the present invention will become more apparent upon a perusal of the following description taken in conjunction with the accompanying drawings wherein.

DESCRIPTION OF THE PREFERRED EMBODIMENTS

Figure 1:
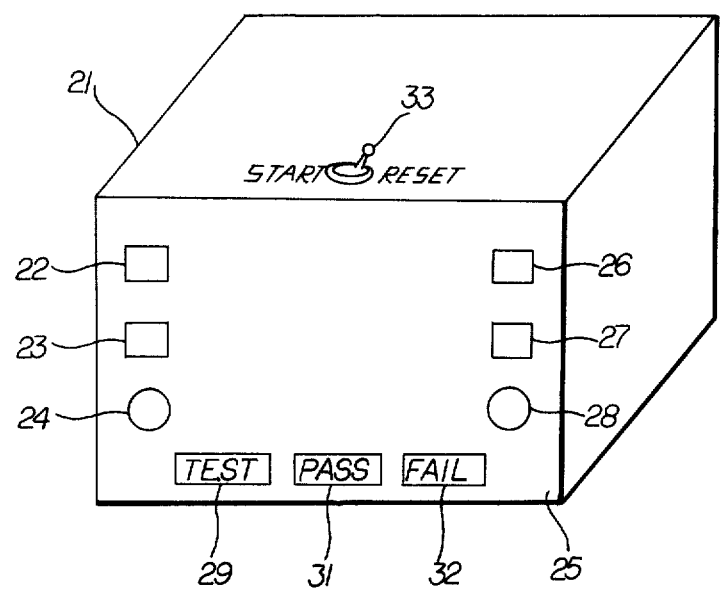
FIG. 1 is an isometric view of a preferred condition responsive control apparatus.

Referring first to FIG. 1 there is shown a condition responsive control apparatus 21 including a first stimulus light 22 and a first auxiliary stimulus light 23 directly therebeneath. Disposed below the two lights 22 and 23 is a first manipulable push button 24. Disposed on the other side of a front panel 25 of the apparatus 21 is a second stimulus light 26, a second auxiliary stimulus light 27 and a second manipulable push button 28. Also on the front panel 25 are three indicator lights 29, 31 and 32 that indicate, respectively, that a test is in progress, that a test has been passed, and that a test has been failed. A reset switch 33 is disposed on the top of the apparatus 21.

Figure 2:
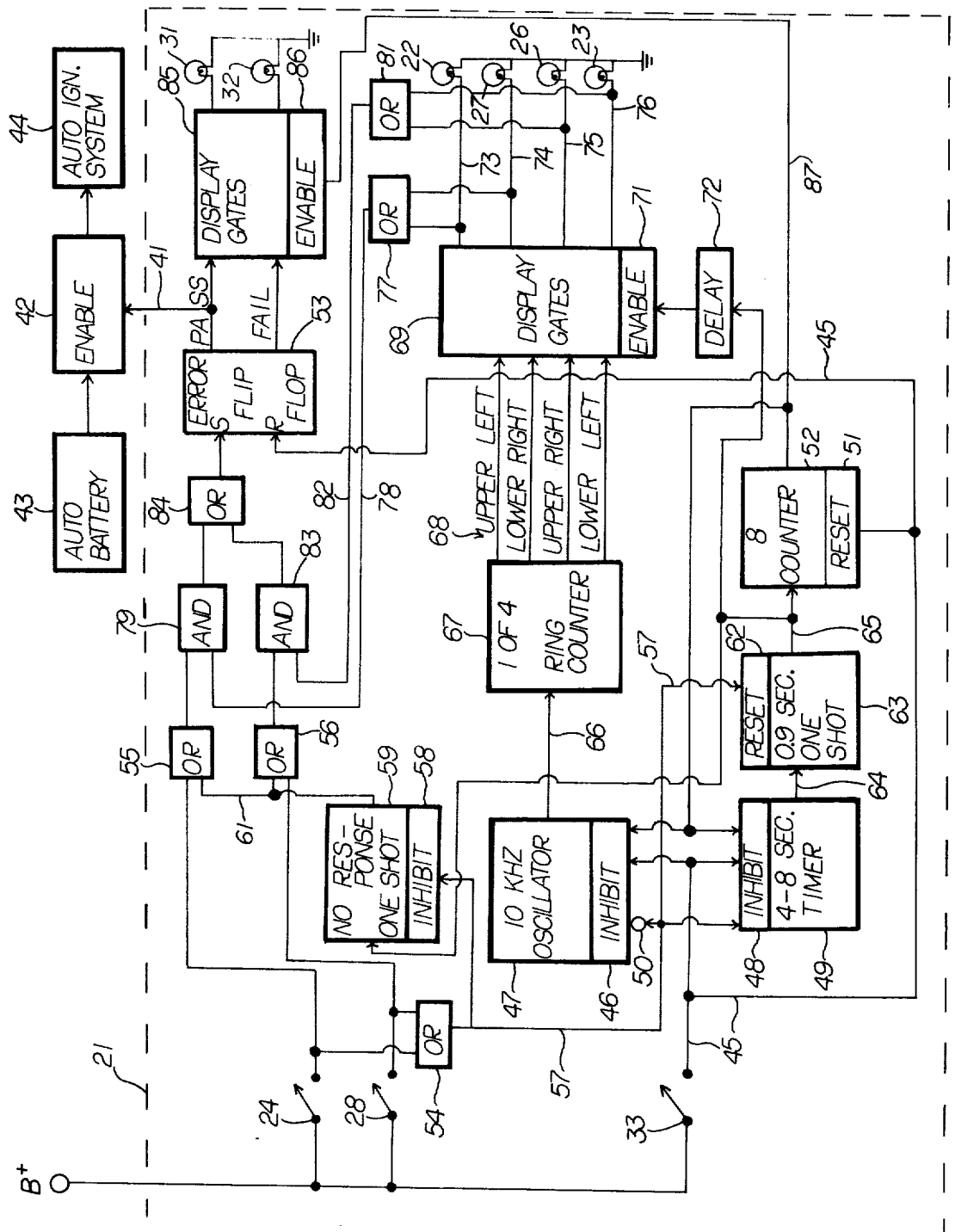
FIG. 2 is a block diagram of the control apparatus depicted in FIG. 1.

Referring now to FIG. 2 there is shown a block diagram of the condition responsive control apparatus 21. An output cable 41 is coupled to an enable circuit 42 that selectively couples an automobile battery 43 to an automobile ignition system 44 within the equipped automobile. In the absence of the appropriate signal on the line 41, the vehicle is inoperable inasmuch as the battery 43 is disconnected from the ignition system 44.

When the reset switch 33 is in the start position, it is open. When the switch 33 is in the reset, or closed position it applies a potential through a line 45 to an inhibit terminal 46 of a high frequency (such as 10 kilohertz) oscillator 47 and to an inhibit terminal 48 of a four-to-eight second repetition timer 49. Furthermore, the line 45 actuates a reset terminal 51 of an eight counter 52 and the reset terminal of an error flip flop 53.

The push button 24, when actuated, applies a potential to open two OR gates 54 and 55. The push button 28, when actuated, applies a potential to the other input of the OR gate 54 and to an input of an OR gate 56. The output of the gate 54 is supplied by a line 57 to an inhibit terminal 58 of a no response one-shot 59 that, when activated, supplies a pulse of a short duration on a line 61 to the remaining inputs of the gates 55 and 56. The line 57 also connects the output of the OR gate 54 to an inverter 50, that inhibit terminal 48 and a reset terminal 62 of a response timer one shot 63 that, when actuated, produces an output for 0.9 seconds unless it is reset during that time period. The inverter 50 is coupled to the inhibit terminal 46. The 0.9 second one shot 63 is coupled to the four-to-eight second timer 49 by a line 64 and is actuated thereby. Furthermore, the output of the one shot 63 is coupled by a line 65 to the eight counter 52.

The output of the oscillator 47 is coupled by a line 66 to a one-of-four randomizing-ring counter 67. A cable 68, composed of four lines, carries the output of the ring counter 67 to display gates 69. An enable terminal 71 of display gates 69 receives the signal on the line 65 through a delay circuit 72. Four output lines 73, 74, 75 and 76 couple the display gates 69 to the stimulus lamps 22, 27, 26 and 23, respectively.

The display gates 69 illuminate one of the lamps 22, 23, 26 or 27 in accordance with the output of the ring counter 67 when an enable signal is present on the line 65.

The lines 73 and 74 are coupled to an OR gate 77, the output of which is coupled by a line 78 to one input of AND gate 79. The AND gate 79 also receives the output of the gate 55. A corresponding OR gate 81 is coupled to the lines 75 and 76 and its output is carried by a line 82 to one input of an AND gate 83. The remaining input of the AND gate 83 receives the output of the OR gate 56. The output of the AND gates 79 and 83 are passed on by an OR gate 84 to the set terminal of the error flip flop 53.

The two outputs of the error flip flop 53 are coupled to display gates 85 that supply power to illuminate the lamps 31 and 32. However, the lamps 31 and 32 are only illuminated when an enable signal is received by an enable terminal 86 on a line 87 from the counter 52. Signals on the line 87 are also carried to the inhibit terminals 46 and 48. When a signal is present on the line 87, the oscillator 47 and the timer 49 are inhibited.

The circuit for illuminating the light 29 is not shown. It is conventional.

To initiate operation of the condition responsive control apparatus 21, the reset switch 33 is first moved to the closed, or reset, position. Closure of the switch 33 inhibits the oscillator 47 and the timer 49. Furthermore, counter 52 and the error flip flop 53 are reset. The switch 33 is then moved to the open, or start, position. At that time, the oscillator 47 remains inoperative due to the effect of the inverter 50. However, the four-to-eight second timer 49 operates. The manner in which the timer 49 is set to time out in a particular period of time between four and eight seconds will be discussed below. When the timer 49 times out, an output is supplied by the line 64 to the 0.9 second one shot multivibrator 63. Consequently, a pulse of 0.9 second duration is supplied on the line 65. That pulse advances the count in the counter 52 by one and, upon passing through the delay circuit 72, is applied to the enable input 71 of the display gates 69 to enable the gates. The line 65 also carries the output of the 0.9 second one shot 63 to the no response one shot 59. However, the no response one shot 59 does not respond as yet because it is trigered by the trailing edge of the pulses on the line 65. The one-of-four ring counter 67 has been previously set to provide an output on one of the four lines comprising the cable 68. The manner in which the counter 67 is set will be discussed below. When the display gates 69 are activated, one of the stimulus lights 22, 23, 26 or 27 will be illuminated. The light which will be illuminated will be the light that corresponds to the line in the cable 68 that is energized.

Assume, for example, that the line corresponding to the upper left stimulus light 22 is energized and thus the light 22 is illuminated. The gate 77 enables the gate 79. The proper response to the illumination of the light 22 is to depress the right hand push button 28. If that is done, a signal is applied to the gate 83. However, that gate is closed inasmuch as the OR gate 81 is receiving no signal. If the improper response is made, that is, the left push button 24 is depressed, a signal is passed to the enabled gate 79 and thereby to the OR gate 84 and thence to set the error flip flop 53. Furthermore, it will be appreciated that if an operator attempts to actuate both push buttons 24 and 28 simultaneously an improper response will be received and the error flip flop 53 will be set.

While either or both of the push buttons 24 and 28 are depressed the OR gate 54 provides an output on the line 57. The inverter 50 then provides no input to the inhibit terminal 46 and the 10 kilohertz oscillator 47 operates and provides a new setting in the ring counter 67. The setting of the ring counter is effectively random inasmuch as the operator cannot judge the duration of the actuation of the push buttons 24 or 28 to fractions of milliseconds. The signal on the line 57 is also applied to the inhibit terminal 48 of the timer 49. The signal applied to the timer 49 resets it and the duration of the signal randomly determines what the duration of the next timing period will be. (Such a timer is available from Grason-Stadler, West Concord, Mass.). The line 57 also applies a reset signal to the reset terminal 62 of the 0.9 second one shot 63 and an inhibit signal to the inhibit input 58 of the no response one shot 59. Thus, the output from the 0.9 second one shot 63 on the line 65 ends when a button 24 or 28 is pushed. However, the no response one shot 59 does not respond to the trailing edge then created inasmuch as a signal is applied to the inhibit terminal 58. The delay circuit 72 provides a delay of only a few milliseconds and thus the display gates 69 are effectively immediately deactivated and thus the stimulus light is extinguished.

Consider the operation of the apparatus in the event that the operator makes no response. No inhibit signal is supplied to the inhibit terminal 58 by the line 57. Thus, the no response one shot 59 provides a pulse on the line 61 upon the occurrence of the trailing edge of the signal on the line 65. The pulse on the line 61 is passed by both the OR gates 55 and 56 to the AND gates 79 and 83. It will be recalled it is the signal on the line 65 that is enabling the display gates 69. However, the display gates remain enabled for a few milliseconds due to the effect of the delay circuit 72. Thus, as the pulse is passed by the OR gates 55 and 56 one of the AND gates 79 or 83 will be enabled inasmuch as one of the OR gates 77 and 81 will still be passing a signal thereto. Consequently, an input is provided by the OR gate 84 that sets the error flip flop 53 in the event that neither button 24 or 28 is depressed during the 0.9 second time period. In summary, assuming that the only response made during first trial was the depression of the proper push button 24 or 28, the error flip flop 53 is not set. Following the expiration of the second four to eight second time period, the timer 49 enables the 0.9 second one shot 63 and the sequence is repeated. However, the stimulus light 22, 23, 26 or 27 that is illuminated during the second trial depends upon the setting of the ring counter 67 that is established during the first trial. Again, a proper response has no effect upon the error flip flop 53. An improper response or no response during the 0.9 second time period will set the error flip flop 53. Also, a new setting is established in the ring counter 67 and a new time period is established in the timer 49 during the response of the second trial.

When the eight counter 52 reaches a count of eight an output is supplied on the line 87 that inhibits the oscillator 47 and the timer 49. Furthermore, that output enables the display gates 85. Consequently, if the error flip flop 53 remains in the reset state, the pass indicator 31 is illuminated and the enable circuit 42 is activated. However, if a signal has been supplied to the set terminal of the error flip flop 53 one or more times, the fail indicator 32 is activated and the enable circuit 42 is not activated.

Conventional timing circuits (not shown) insure that the enable circuit 42 remains activated if the automobile engine stalls or if the engine is turned off for a brief period of time. Furthermore, conventional timers are included to insure that following failure of the test the operator cannot immediately reactivate the reset switch 33 and try again. If the test is failed, a predetermined time delay, for example, in the range of 10 minutes to an hour, must pass prior to attempting the test again.

Obviously, many modifications and variations of the present invention are possible in light of the above teachings. For example, it will be appreciated that the error flip flop can be modified so as to allow one or more incorrect responses and still indicate a passing result. It is to be understood, therefore, that the invention can be practiced otherwise than as specifically described.

What is claimed is:

1. Condition responsive control apparatus comprising:
   first stimulus means and first manipulable means spacially opposed therewith;
   second stimulus means and second manipulable means spacially opposed therewith; wherein said first stimulus means and said first manipulable means are spacially separated from said second manipulable means;
   actuation means for actuating either of said stimulus means independently of actuation of the other one of said stimulus means;
   output means for indicating a correct response when one of said stimulus means is activated and an operator manipulates, in a preselected manner, the one of said manipulable means that is spacially separated from the one of said stimulus means that is activated; and
   response timer means for preventing said output means from indicating a correct response if the operator fails to manipulate the appropriate one of said manipulable means within a preselected response period of time.

2. Apparatus according to claim 1 wherein said output means comprises a portion of a motor vehicle and further comprises enabling means for permitting the operation of said motor vehicle following an indication of said correct response.

3. Apparatus according to claim 2 wherein said output means comprises error means for preventing the operation of said motor vehicle when activated, and wherein said error means is activated if, in response to the activation of one of said stimulus means, the manipulable means spacially associated therewith is manipulated.

4. Apparatus according to claim 3 comprising timer coupling means for coupling said response timer means to said error means so as to activate said error means upon the failure of an operator to respond to either of said stimulus means within the predetermined time.

5. Apparatus according to claim 4 wherein each of said stimulus means comprises a light.

6. Apparatus according to claim 5 comprising repetition means for causing said actuation means to repeatedly actuate said stimulus means.

7. Apparatus according to claim 6 comprising randomizing means for randomly determining the order of actuation of said stimulus means.

8. Apparatus according to claim 7 comprising auxiliary first stimulus means spacially associated with said first stimulus means and said first manipulable means and further comprising auxiliary second stimulus means spacially associated with said second stimulus means and said second manipulable means, both of said auxiliary stimulus means being responsive to said actuation means, and wherein said output means comprises auxiliary output means for causing an indication of a correct response when one of said auxiliary stimulus means is activated and the spacially associated manipulable means is manipulated in the preselected manner within the preselected period of time.

9. Apparatus acccording to claim 8 comprising means for rendering said randomizing means responsive to actuation of said manipulable means.

10. Apparatus according to claim 9 wherein said randomizing means comprises a high frequency oscillator and a ring counter and wherein said oscillator is coupled to said ring counter.

11. Apparatus according to claim 8 wherein said auxiliary stimulus means are disposed closer to the respective manipulable means than are said first and second stimulus means.

* * * * *